United States Patent
Zhang et al.

(10) Patent No.: US 6,187,467 B1
(45) Date of Patent: Feb. 13, 2001

(54) IONOMER IMPREGNATION OF ELECTRODE SUBSTRATES FOR IMPROVED FUEL CELL PERFORMANCE

(75) Inventors: Jiujun Zhang, Richmond; Kevin M. Colbow; David P. Wilkinson, both of North Vancouver, all of (CA)

(73) Assignee: Ballard Power Systems Inc., Burnaby (CA)

( * ) Notice: Under 35 U.S.C. 154(b), the term of this patent shall be extended for 0 days.

(21) Appl. No.: 09/222,507

(22) Filed: Dec. 29, 1998

Related U.S. Application Data

(63) Continuation-in-part of application No. 09/173,845, filed on Oct. 16, 1998.

(51) Int. Cl.⁷ .................................................. H01M 4/86
(52) U.S. Cl. .................. 429/42; 429/40; 429/41; 429/44; 429/12; 429/14; 502/101
(58) Field of Search .................. 429/12, 14, 40, 429/41, 42, 44; 502/101

(56) References Cited

U.S. PATENT DOCUMENTS

| | | | |
|---|---|---|---|
| 4,229,490 | 10/1980 | Frank et al. ........................ | 427/113 |
| 4,876,115 | 10/1989 | Raistrick ............................. | 427/115 |
| 5,084,144 | 1/1992 | Reddy et al. ....................... | 205/104 |
| 5,292,600 | 3/1994 | Kaufman ............................ | 429/39 |
| 5,523,177 | 6/1996 | Kosek et al. ....................... | 429/40 |
| 5,599,638 | * 2/1997 | Surampudi et al. ................. | 429/42 |
| 5,672,439 | 9/1997 | Wilkinson et al. ................. | 429/40 |
| 5,773,162 | 6/1998 | Surampudi et al. ................. | 429/39 |
| 5,795,496 | * 8/1998 | Yen et al. ........................... | 429/33 |
| 5,874,182 | * 2/1999 | Wilkinson et al. ................. | 429/40 |
| 5,945,231 | * 8/1999 | Naraganan et al. ................ | 429/40 |
| 5,992,008 | * 11/1999 | Kindler .............................. | 429/42 |
| 6,074,773 | * 6/2000 | Wilkinson et al. ................. | 429/40 |

FOREIGN PATENT DOCUMENTS

| | | |
|---|---|---|
| 0 687 023 A1 | 12/1995 | (EP) . |
| 2-049356 | 2/1990 | (JP) . |
| 4-206153 | 7/1992 | (JP) . |
| WO 96/12317 | 4/1996 | (WO) . |

OTHER PUBLICATIONS

Lee, et al., "Effects of Nafion Impregnation on Performances of PEMFC Electrodes," Electrochimica Acta, 43(24):3693–3701 (1998) No Month Available.

Kinoshita, "Carbon Electrochemical and Physicochemical Properties," John Wiley & Sons, Inc., New York, U.S.A., p. 86–88 (1988), No Month/Available.

McCreery, *Electroanalytical Chemistry*, edited by A.J. Bard, Marcel Dekker, Inc., New York, pp. 258–267 (1991), No Month/Available.

Pu, et al., "A Methanol Impermeable Proton Conducting Composite Electrolyte System," *J. Electrochem. Soc.*, 142(7):L119–L120 (Jul., 1995).

\* cited by examiner

*Primary Examiner*—Bruce F. Bell
(74) *Attorney, Agent, or Firm*—McAndrews, Held & Malloy, Ltd.

(57) ABSTRACT

Liquid feed fuel cell performance can be increased by impregnating electrode substrates with a proton conducting ionomer prior to incorporation of the electrocatalyst, and optionally also after application of the electrocatalyst. Ionomer impregnation is particularly effective for direct methanol fuel cell anodes that comprise carbonaceous substrates.

23 Claims, 7 Drawing Sheets

IONOMER IMPREGNATION OF ELECTRODE SUBSTRATES FOR IMPROVED FUEL CELL PERFORMANCE

CROSS-REFERENCE TO RELATED APPLICATION

This application is a continuation-in-part of U.S. patent application Ser. No. 09/173,845 filed Oct. 16, 1998, entitled "Electrode Treatment Method For Improving Performance In Liquid Feed Fuel Cells", still pending. The '845 application is incorporated herein by reference in its entirety.

FIELD OF THE INVENTION

The present invention relates to methods for improving fuel cell performance involving ionomer impregnation of fuel cell electrode substrates. In particular, it relates to methods for improving performance in liquid feed fuel cells, such as direct methanol fuel cells (DMFCs).

BACKGROUND OF THE INVENTION

Electrochemical fuel cells convert reactants, namely, fuel and oxidant fluid streams, to generate electric power and reaction products. Electrochemical fuel cells generally employ an electrolyte disposed between two electrodes, namely a cathode and an anode. An electrocatalyst is needed to induce the desired electrochemical reactions at the electrodes. In addition to electrocatalyst, the electrodes may also comprise a porous electrically conductive sheet material, or "electrode substrate", upon which the electrocatalyst is deposited. The electrocatalyst may be a metal black, an alloy or a supported metal catalyst, for example, platinum on carbon.

A particularly attractive fuel cell is the solid polymer electrolyte fuel cell that employs a membrane electrode assembly ("MEA"). The MEA comprises a solid polymer electrolyte or ion-exchange membrane disposed between the two electrode layers. Flow field plates for directing the reactants across one surface of each electrode substrate are disposed on each side of the MEA.

Electrocatalyst can be incorporated at the electrode/ electrolyte interfaces in solid polymer fuel cells by applying it in a layer on either an electrode substrate or on the membrane electrolyte. In the case of the former, electrocatalyst particles are typically mixed with a liquid to form a slurry or ink, which is then applied to the electrode substrate. While the slurry preferably wets the substrate surface to some extent, it is important that it doesn't penetrate too deeply into the substrate or else some of the catalyst will not be located at the desired membrane electrolyte interface.

Effective electrocatalyst sites are accessible to the reactant, are electrically connected to the fuel cell current collectors, and are ionically connected to the fuel cell electrolyte. Electrons and protons are typically generated at the anode electrocatalyst. The electrically conductive anode is connected to an external electric circuit, which conducts an electric current. The electrolyte is typically a proton conductor, and protons generated at the anode electrocatalyst migrate through the electrolyte to the cathode. Electrocatalyst sites are not productively utilized if the protons do not have a means for being ionically transported to the electrolyte. Accordingly, coating the exterior surfaces of the electrocatalyst particles with ionically conductive ionomer coatings has been used to increase the utilization of electrocatalyst exterior surface area and increase fuel cell performance by providing improved ion-conducting paths between the electrocatalyst surface sites and the electrolyte. The ionomer can be incorporated in the catalyst ink or can be applied on the catalyst-coated substrate afterwards.

A measure of electrochemical fuel cell performance is the voltage output from the cell for a given current density. Higher performance is associated with a higher voltage output for a given current density or higher current density for a given voltage output. Increasing effective utilization of the electrocatalyst enables the same amount of electrocatalyst to induce a higher rate of electrochemical conversion in a fuel cell resulting in improved performance.

A broad range of reactants can be used in electrochemical fuel cells and such reactants may be delivered in gaseous or liquid streams. For example, the fuel stream may be substantially pure hydrogen gas, a gaseous hydrogen-containing reformate stream, or aqueous methanol in a direct methanol fuel cell (DMFC). The oxidant may, for example, be substantially pure oxygen or a dilute oxygen stream such as air.

Solid polymer fuel cells that operate on liquid reactant streams ("liquid feed fuel cells") have somewhat different requirements than those operating on gaseous reactant streams. The requirements for effectively distributing a liquid reactant stream and making reactant contact with the electrocatalyst layer are different than for a gas stream. For example, hydrophobic components such as PTFE are typically employed in gaseous feed fuel cells, in part, to render electrodes less wettable and to prevent "flooding". (Flooding generally refers to a situation where the pores in an electrode are so full of liquid, e.g. reaction product water, that the flow of the gaseous reactant through the electrode becomes impeded.) In liquid feed fuel cells however, it can be desirable to make components in the anode (e.g. catalyst layer) more wettable by the liquid fuel stream in order to improve access of the reactant to the electrocatalyst sites.

In early DMFCs, sulfuric acid was incorporated in the liquid methanol fuel stream in order to enhance proton conduction at the anode. The presence of sulfuric acid however may limit the performance of the fuel cell in other ways and impose constraints on the fuel cell hardware for corrosion reasons. Acid electrolyte additives are no longer considered necessary to obtain reasonable performance from a DMFC. Instead, ionomeric coatings of the anode in the vicinity of the catalyst layer can provide for satisfactory proton conduction. Such an ionomeric coating may also improve wetting and hence access of the aqueous methanol fuel.

While it may seem desirable generally to improve the wetting of a DMFC anode, treatments that improve wetting of the anode per se, do not necessarily result in a net performance improvement.

For example, an ionomer coating also can act as a barrier to the transport of electrons, liquid fuel, and reaction product gases (e.g. carbon dioxide from methanol oxidation) thereby reducing net performance of fuel cells. Thus, the net effect of such treatments is not always possible to predict. Recently, it was disclosed in U.S. patent application Ser. No. 09/173,845, filed Oct. 16, 1998 by the same applicant as the present application and previously incorporated herein by reference in its entirety, that the performance of liquid feed fuel cells can be improved by impregnating the electrode substrates of the fuel cell with ionomer before application of the electrocatalyst. After the electrocatalyst has been applied, it may be advantageous to apply additional ionomer.

SUMMARY OF THE INVENTION

An ionomer impregnation method may be used to improve the performance of a liquid feed, solid polymer electrolyte fuel cell. In operation, a liquid feed fuel cell has at least one electrode supplied with a liquid reactant stream. The electrode comprises a substrate and an electrocatalyst and the method comprises impregnating the substrate with a first proton conducting ionomer before applying electrocatalyst to the impregnated substrate. Such impregnation has been found to be advantageous for use with carbonaceous substrates (e.g., carbon fiber paper) employed in the electrodes of direct liquid feed fuel cells. Liquid reactant streams most commonly in use at this time are primarily fuel streams, including aqueous solutions of alcohols, ethers, and the like. Impregnation is particularly advantageous for use in the anodes of direct methanol fuel cells (DMFCs). At present, a preferred electrocatalyst for use in DMFCs is a platinum and ruthenium alloy.

The first proton conducting ionomer may be selected from a variety of ionomers including fluorinated and perfluorinated functionalized polyolefins and polyethers or polystyrenes. It may be similar to the membrane electrolyte of the MEA into which the electrode substrate is to be incorporated. For example, the first proton conducting ionomer may be a poly(perfluorosulphonic acid) such as Nafion™ of various equivalent weights available from DuPont. Fuel cell performance can be improved when the substrate is impregnated with about 0.1 mg/cm$^2$ to about 0.3 mg/cm$^2$ loading of poly(perfluorosulphonic acid).

Preferably, a second proton conducting ionomer is applied to the impregnated substrate after application of the electrocatalyst, to further improve performance. Preferably, the sum of the loading of the first proton conducting ionomer in the impregnated substrate and the loading of the second proton conducting ionomer applied to the impregnated substrate is in the range from about 0.4 to 0.6 mg/cm$^2$. Further, the loading of the first proton conducting ionomer incorporated in the substrate is preferably about equal to the loading of the second proton conducting ionomer. The same or different polymers may be used as the first and second proton conducting ionomers. For example, it may be desirable for the first proton conducting ionomer to select a polymer that significantly enhances proton conductivity or wettability, while selecting a polymer that is most compatible with the MEA membrane electrolyte for the second proton conducting ionomer.

Impregnation of the electrode substrate with the first proton conducting ionomer can be accomplished using a variety of techniques such as, for example, by dipping the substrate in a solution comprising the first proton conducting ionomer. A solution comprising about 1% of the first proton conducting ionomer in alcohol is typically suitable for impregnation. Impregnation can also be accomplished by spraying the substrate with similar types of solutions, brush coating, etc. Application of a second proton conducting ionomer can be accomplished in a like manner.

Similarly, electrocatalyst may be applied to the impregnated substrate using various conventional techniques, such as, for example, screen printing, spray coating, roll coating, and spreading. Often, electrocatalyst is applied to electrode substrates in the form of an aqueous ink. Without impregnating the substrate with ionomer beforehand, electrocatalyst applied in this manner may penetrate deeply into the substrate instead of remaining in a surface layer thereon. Along with electrocatalyst and water, the aqueous ink often comprises a third proton conducting ionomer that can serve as a binder for the applied electrocatalyst. This third proton conducting ionomer can also be the same or different from the first and second proton conducting polymers. Fuel cell performance may be improved when the loading of a third proton conducting ionomer in the impregnated substrate is less than about 0.5 mg/cm$^2$.

DETAILED DESCRIPTION OF THE PREFERRED EMBODIMENTS

Figure 1:
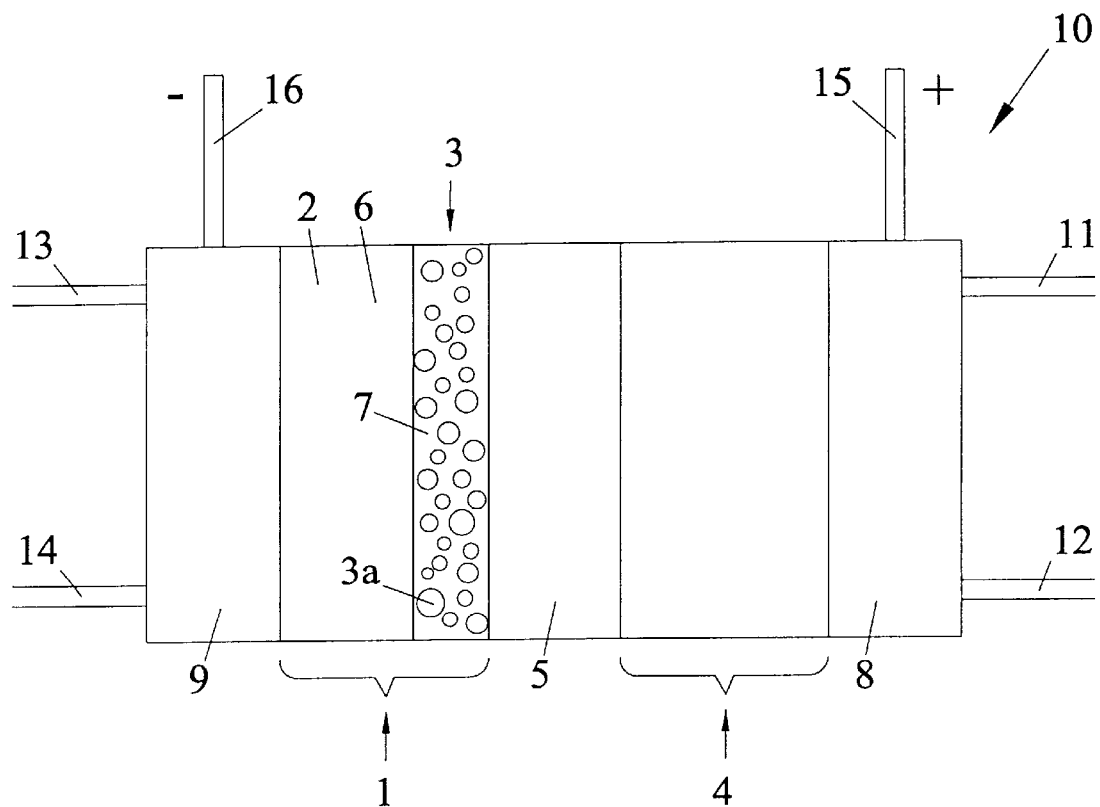
FIG. 1 is a schematic diagram of a liquid feed, solid polymer electrolyte fuel cell.

Improved performance may be obtained with a variety of porous fuel cell electrodes intended for use with liquid reactants by impregnating the electrode substrates with ionomer prior to the application of electrocatalyst. Usually, it is desirable for such electrodes to be highly wettable by the liquid reactant. However, this may result in difficulties with the liquid electrocatalyst ink penetrating into the substrate to an undesirable degree when it is applied. Ionomer impregnation of such wettable electrode substrates may reduce the tendency for the electrocatalyst ink to soak into the substrate. This may be a reason why such electrodes show a more significant improvement as a result of impregnation.

Liquid reactant streams more commonly in use at this time are fuel streams, and thus a preferred embodiment is an impregnated anode for a liquid feed fuel cell. An impregnated anode for a direct methanol fuel cell (DMFC) is particularly preferred. Commonly, carbonaceous substrates are used in a DMFC, including carbon fiber papers, carbon cloths, carbon fiber non-woven materials, and composite materials including particulate carbons (e.g., carbon-filled plastic mesh). Any suitable electrocatalyst may be used e.g., metal blacks, supported metal catalyst and metal alloys. For direct methanol fuel cells, presently preferred anode catalysts include alloys of platinum and ruthenium.

A selected substrate may be impregnated, for example, by dipping it for a few minutes in a solution comprising a proton conducting ionomer and then drying off the carrier solvent. Depending on the porosity and the solution, this method generally results in impregnation of the entire volume of substrate with some ionomer, although the substrate remains porous. Alternatively, other impregnation methods might be employed that impregnate the substrate mainly in the vicinity of one or both major surfaces (e.g., spray or screen printing or other coating methods). Preferred proton conducting ionomers include Nafion™ in various equivalent weights (e.g. 1100 and 900 equivalent weight) and BAM™ trifluorostyrene-based ionomer compositions. An ionomer loading of about 0.1 to 0.3 mg/cm$^2$ of substrate has been shown to be effective. A lesser loading may not be sufficient to result in a substantial improvement, while a greater loading may begin to adversely effect the electrical connection between the electrocatalyst particles and the electrically conductive substrate, and/or block pores in the substrate thereby impeding reactant access to the electrocatalyst.

The ionomer weight per unit area (loading) incorporated into the substrate by the dipping method depends primarily on the concentration of the ionomer in solution. For example, a 1% Nafion™ polymer solution in an alcohol (e.g., isopropanol) can be used to prepare carbonaceous substrates with ionomer loadings in the aforementioned range. Greater loadings may be obtained, for example, by using either a more concentrated solution or via multiple dipping/drying steps.

An electrocatalyst is then applied to the impregnated substrate. Various methods of applying catalyst are known (e.g. spraying, screen printing, or ink-jet printing a slurry thereon, etc.). Commonly, the electrocatalyst is applied in the form of an aqueous ink, where the ink includes a proton conducting ionomer in solution. If desired, the ionomer in the ink may be the same as that used for impregnation.

The electrocatalyzed, impregnated substrate may then be further coated or impregnated with a proton conducting ionomer in a manner similar to that used for the first impregnation. It has been discovered that the relative loadings of ionomer introduced into the substrate in each of these pre-catalyst and post-catalyst impregnations, as well as the total ionomer loading, has a significant effect on fuel cell performance. For example, the incorporation of approximately equal loadings of ionomer in pre-catalyst and post-catalyst impregnations, to give a total loading of order of 0.4–0.6 mg/cm$^2$, is preferred for certain embodiments, as illustrated in the following Examples. However, the preferred loadings may differ with fuel cell construction and operating conditions, and thus some routine optimization may be needed to determine preferred loadings for any given embodiment. Another variable to consider in any such routine optimization is the amount of ionomer introduced in an electrocatalyst-containing ink.

After fabricating an anode as described above, the construction of a liquid feed fuel cell comprising the anode may be conventional. FIG. 1 shows schematically a typical fuel cell assembly 10 containing a porous anode 1 comprising a carbonaceous substrate 2 that has been impregnated with ionomer before the application of electrocatalyst layer 3. Fuel cell assembly 10 contains at least one membrane electrode assembly (MEA) comprising a porous cathode 4 and porous anode 1 that are bonded to a solid polymer membrane electrolyte 5. Electrocatalyst 3a is disposed at the interface between carbonaceous substrate 2 and membrane electrolyte 5. Ionomer 6 is preferably dispersed throughout the porous substrate as a result of the aforementioned impregnation. Ionomer 7 also is preferably dispersed throughout the applied electrocatalyst layer 3 as a result of applying the electrocatalyst 3a in an ionomer ink solution. Alternatively ionomer 7 may be applied in another impregnation step after deposition of the electrocatalyst 3a. (The electrocatalyst layer on the cathode 4 is not shown.) Oxidant flow field 8 and liquid fuel flow field 9 are pressed against cathode 4 and anode substrate 2 respectively on the faces opposite the membrane electrolyte 5. Fuel cell assembly 10 has an oxidant inlet 11, an oxidant outlet 12, a liquid fuel stream inlet 13, and a liquid fuel stream outlet 14. Electrical power is obtained from the fuel cell via positive and negative terminals 15 and 16 respectively.

Without being bound by theory, the performance improvements associated with the above described impregnation method may arise for several reasons. The initial ionomer impregnation likely results in a thin coating of ionomer disposed over a large portion of the porous substrate surface area. The coating may reduce the size of the pores and alter the wettability of the impregnated substrate. The former effect may reduce the tendency for electrocatalyst to penetrate too deeply into the substrate, and thus keep it localized at the substrate/membrane interface in the MEA where it is preferably located. If the latter effect reduces wettability of a substrate by the electrocatalyst ink, then this would also be expected to prevent electrocatalyst from sinking excessively into the substrate. Whether impregnation increases or decreases substrate wettability depends on the initial nature and properties of the substrate. Additionally, ionomer coatings on an electrode substrate may generally result in better transport of reactants and products (e.g., methanol, $CO_2$) whether applied before or after deposition of an electrocatalyst. However, the ionomer distribution may be superior for such transport if some is incorporated before depositing electrocatalyst ("between" the substrate and electrocatalyst).

The following examples have been included to illustrate different embodiments and aspects of the invention but these should not be construed as limiting in any way. Examples 1 and 2(a) below correspond to Examples 4(c) and 4(d), respectively, in the aforementioned U.S. patent application Ser. No. 09/173,845. These examples also show the potential benefits of electrochemically oxidizing the anode substrate prior to applying the electrocatalyst in liquid feed fuel cells.

EXAMPLE 1

A series of four fuel cell anodes was prepared to evaluate the effects of ionomer impregnation and of electrochemically oxidizing the anode substrate in test cells. Four 5.7 cm$^2$ pieces of carbon fiber paper, TGP-H-090 grade from Toray, were used to construct anodes for a miniature complete test fuel cell. Two pieces were electrochemically oxidized in a beaker cell containing 0.5 M $H_2SO_4$ and a graphite counter electrode, at a constant current of 3 A and a cell voltage of about 4 V for 10 minutes. These test anode substrates were removed from the beaker cell after oxidative treatment and were then rinsed in water and dried. The other two pieces were not treated electrochemically, for comparative purposes.

Next, one of each of these treated and untreated pieces were impregnated with ionomer prior to application of the electrocatalyst. Ionomer impregnation was accomplished by dipping the substrates in a 1% solution of Nafion™ ionomer in isopropanol to give a coating of about 0.3 mg/cm$^2$ ionomer. About 4 mg/cm$^2$ of catalyst was then manually applied with a spatula to the surface of each test anode substrate using an aqueous catalyst ink comprising a commercial Pt—Ru (1:1 atomic ratio) alloy catalyst from Johnson-Matthey and de-ionized water. The oxidatively treated and impregnated substrate was noticeably less wetted by the applied aqueous catalyst ink than the oxidatively treated substrate that had not been impregnated with ionomer. Thereafter, Nafion™ ionomer was applied to each test anode substrate in a 1% propanol solution to give a coating of about 0.3 mg/cm².

Small scale fuel cells using MEAs consisting of a conventional air cathode and a test anode with Nafion™ 117 membrane were used to test methanol oxidation rate in an actual fuel cell environment. Flow field plates were pressed against both cathode and anode, and a liquid 0.5 M $CH_3OH$ fuel stream and air oxidant were directed to each respectively. The fuel cells were operated with a fuel flow rate of about 14 mLpm and an air flow rate of about 0.23 slpm at 95° C. The fuel and air stoichiometries were about 38 and 12.5 at 300 mA/cm² respectively.

Figure 2:
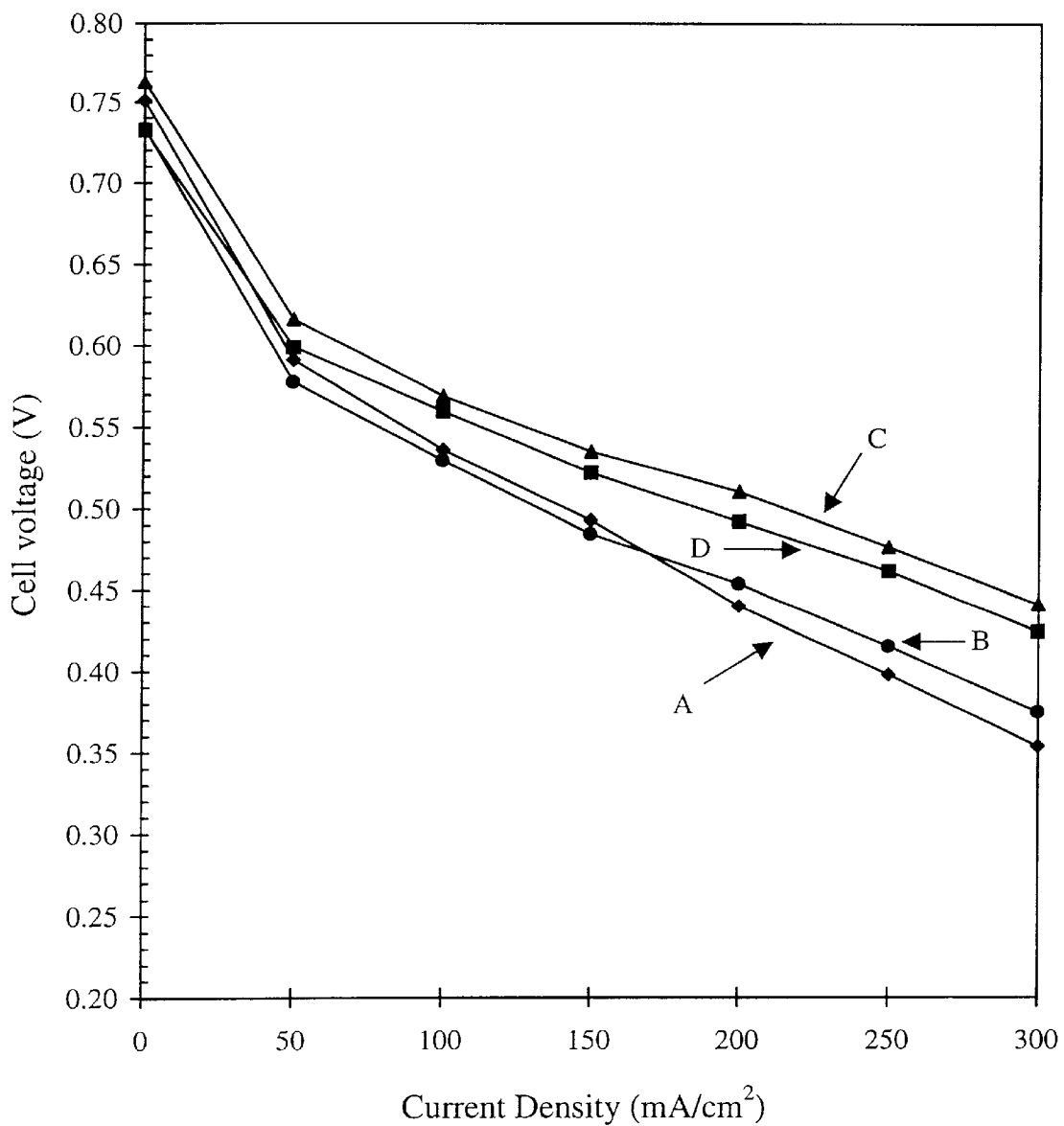
FIG. 2 is a plot showing voltage versus current density plots for the fuel cells of Example 1 incorporating various anode substrates that had been differently impregnated and/or oxidized.

Plots of the cell voltage versus current density using the four anodes are shown in FIG. 2. In FIG. 2, the treated and untreated anodes that had not been impregnated with ionomer prior to catalyst application are denoted A and B respectively. The treated and untreated anodes that had been impregnated with ionomer prior to catalyst application are denoted C and D respectively. The differences in anode preparation are summarized in Table 1.

TABLE 1

| Anode | Oxidized? | Ionomer impregnated? |
|---|---|---|
| A | Y | N |
| B | N | N |
| C | Y | Y |
| D | N | Y |

A comparison of plots D and B shows that impregnating a substrate (which was not oxidatively treated) with Nafion™ prior to application of the electrocatalyst results in a significant performance improvement. Further, the cell incorporating the impregnated, oxidatively treated anode substrate C showed a significant performance improvement over the cell incorporating the substrate D which was not oxidatively treated but impregnated at all current densities. Thus, the oxidative treatment also appears beneficial in this case. However, the fuel cell comprising the oxidatively treated anode substrate A that was not impregnated shows disappointing performance, particularly at high current density, in relation to the comparative fuel cell comprising the untreated anode substrate B. Thus, in the absence of impregnation, the oxidative treatment seems detrimental to performance here. Impregnation on the other hand, in the absence of oxidative treatment, still seems beneficial.

EXAMPLE 2

(a) Three 49 cm² pieces of TGP-H-090 were used to construct anodes for larger test fuel cells. Two pieces, denoted E and F, were electrochemically oxidized as above at a constant current of 5 A at a cell voltage about 4 V for 10 minutes. The remaining piece, denoted G, was left untreated for comparative purposes. All three substrates were then impregnated with ionomer as in Example 1 above except that substrate F was impregnated twice, resulting in a total Nafion™ loading of about 0.6 mg/cm² (versus about 0.3 mg/cm² for E and G) prior to application of the aqueous catalyst ink. Anode fabrication was then completed as in Example 1.

Fuel cell construction was similar to that of Example 1 above except that the fuel cell was larger and Nafion™ 1135 membrane was used. The fuel stream was aqueous 0.4 M $CH_3OH$ at a fuel stoichiometry of 3 and oxidant air was used at a stoichiometry of 2 at 110° C.

Figure 3:
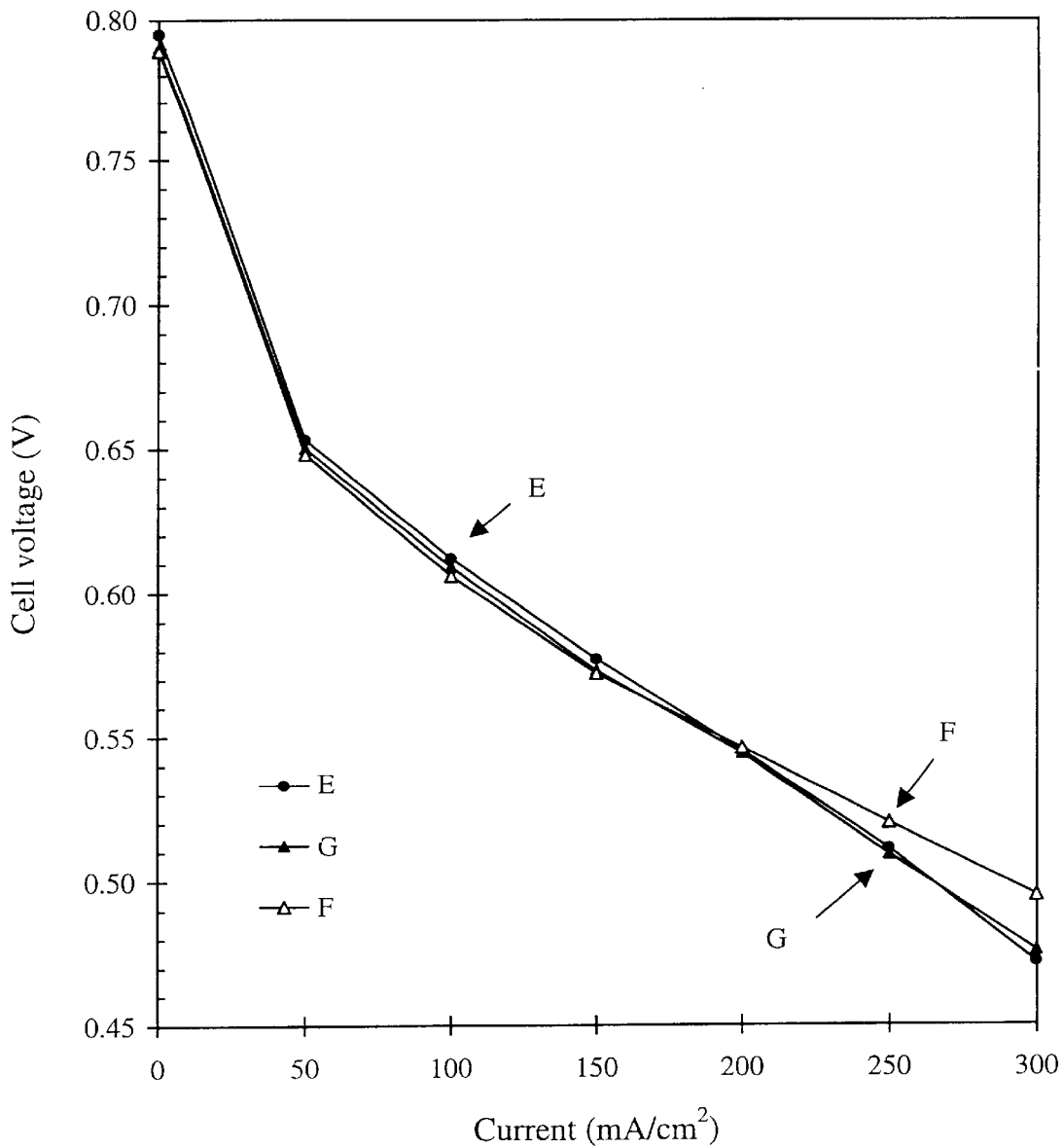
FIG. 3 is a plot showing voltage versus current density plots for the fuel cells of Example 2(a) incorporating various anode substrates which had been differently impregnated and/or oxidized.

Plots of the cell voltage versus current density using the three anode substrates are shown in FIG. 3. Here, a significant net improvement in performance over the cell incorporating substrate G was observed at the highest current density for the doubly impregnated anode substrate F. This improvement may result from the oxidative treatment or the extra impregnation. The net performance improvement with oxidative treatment and impregnation is not as great as that observed in Example 1. This may be a result of increased methanol crossover in these experiments since greater crossover would be expected with a Nafion™ 1135 membrane than a Nafion™ 117 membrane.

(b) Three more 49 cm² pieces of TGP-H-090 were used to construct anodes H, I, J, for larger test fuel cells as in Example 2(a). None of these pieces was electrochemically oxidized. Different preparation techniques were used in each case to observe combination effects of impregnation, electrocatalyst application method, and subsequent ionomer application (i.e., post-electrocatalyst application). In some cases, therefore, electrocatalyst was applied using a spray technique. The preparation techniques used for each anode in Examples 2(a) and 2(b) are summarized in Table 2.

TABLE 2

| Anode | Oxidized? | Ionomer impregnated? | Manual or sprayed electrocatalyst? | Post-electrocatalyst ionomer? |
|---|---|---|---|---|
| E | Y | Y | Manual | Y |
| F | Y | Y (twice) | Manual | Y |
| G | N | Y | Manual | Y |
| H | N | N | Manual | Y |
| I | N | N | Sprayed | N |
| J | N | Y | Sprayed | Y |

Figure 4:
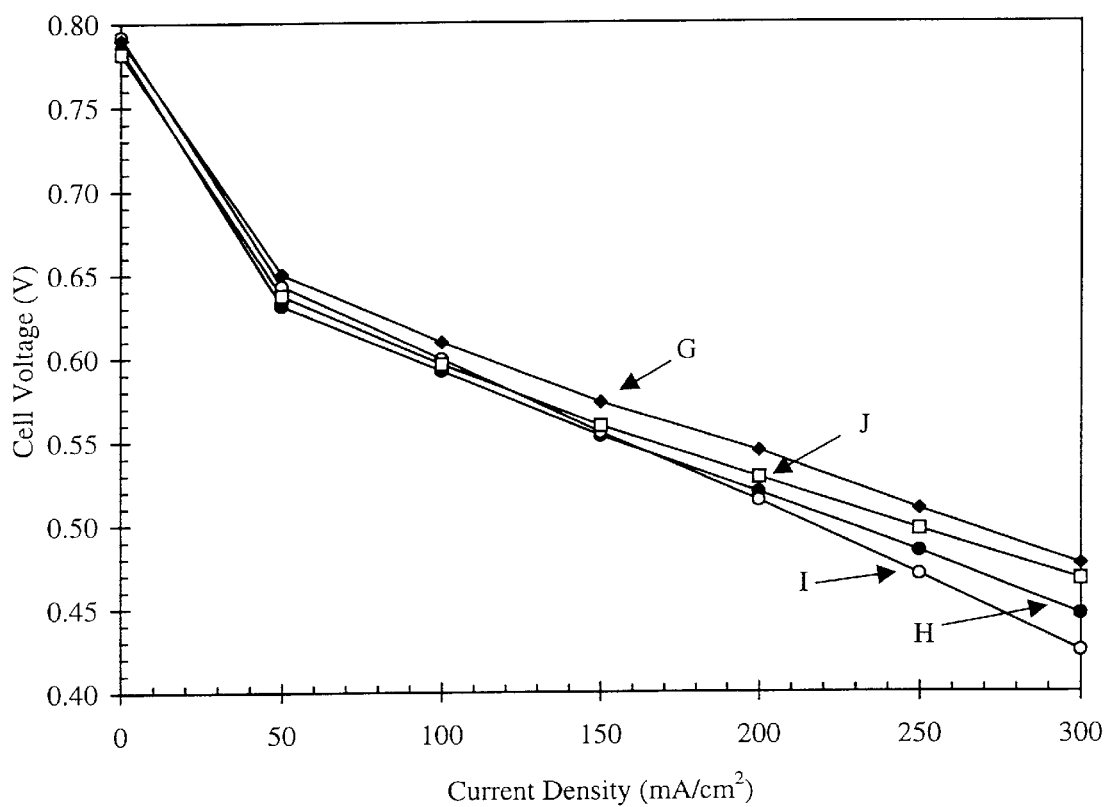
FIG. 4 is a plot showing voltage versus current density plots for the fuel cells of Example 2(b) incorporating anode substrates which were prepared differently with regards to initial ionomer impregnation, electrocatalyst application method, and subsequent ionomer application.

Fuel cells were constructed and tested as in Example 2(a). Plots of the cell voltage versus current density using the anode substrates that were not oxidized (including G) are shown in FIG. 4. The cells with impregnated substrates G and J again performed better than cells without impregnated substrates H and I. The results also suggest that the method of electrocatalyst application and/or subsequent ionomer application may also have an effect on performance. Nonetheless, the overall results in Examples 2(a) and 2(b) demonstrate that, independent of electrocatalyst application method and whether or not oxidative substrate treatment or subsequent ionomer application is performed, fuel cell performance is consistently improved when the substrate is impregnated with ionomer prior to electrocatalyst application.

EXAMPLE 3

Another series of four 5.7 cm² fuel cell anodes was prepared with varying ionomer loadings incorporated during an initial ionomer impregnation step and in subsequent application steps following a sprayed application of electrocatalyst. Also, an aqueous ink comprising electrocatalyst and an ionomer in solution was employed. Otherwise, the four 5.7 cm² anodes were prepared as in Example 1. The loadings incorporated at each stage in each anode are summarized in Table 3.

TABLE 3

| Anode | Ionomer loading in impregnated substrate (mg/cm$^2$) | Ionomer loading from catalyst ink (mg/cm$^2$) | Ionomer loading applied after catalyst (mg/cm$^2$) | Total ionomer loading (mg/cm$^2$) |
| --- | --- | --- | --- | --- |
| K | 0.29 | 0.49 | 0.25 | 1.03 |
| L | 0.29 | 0.49 | 0 | 0.78 |
| M | 0 | 0.45 | 0.42 | 0.87 |
| N | 0 | 0.45 | 0 | 0.45 |

Figure 5:
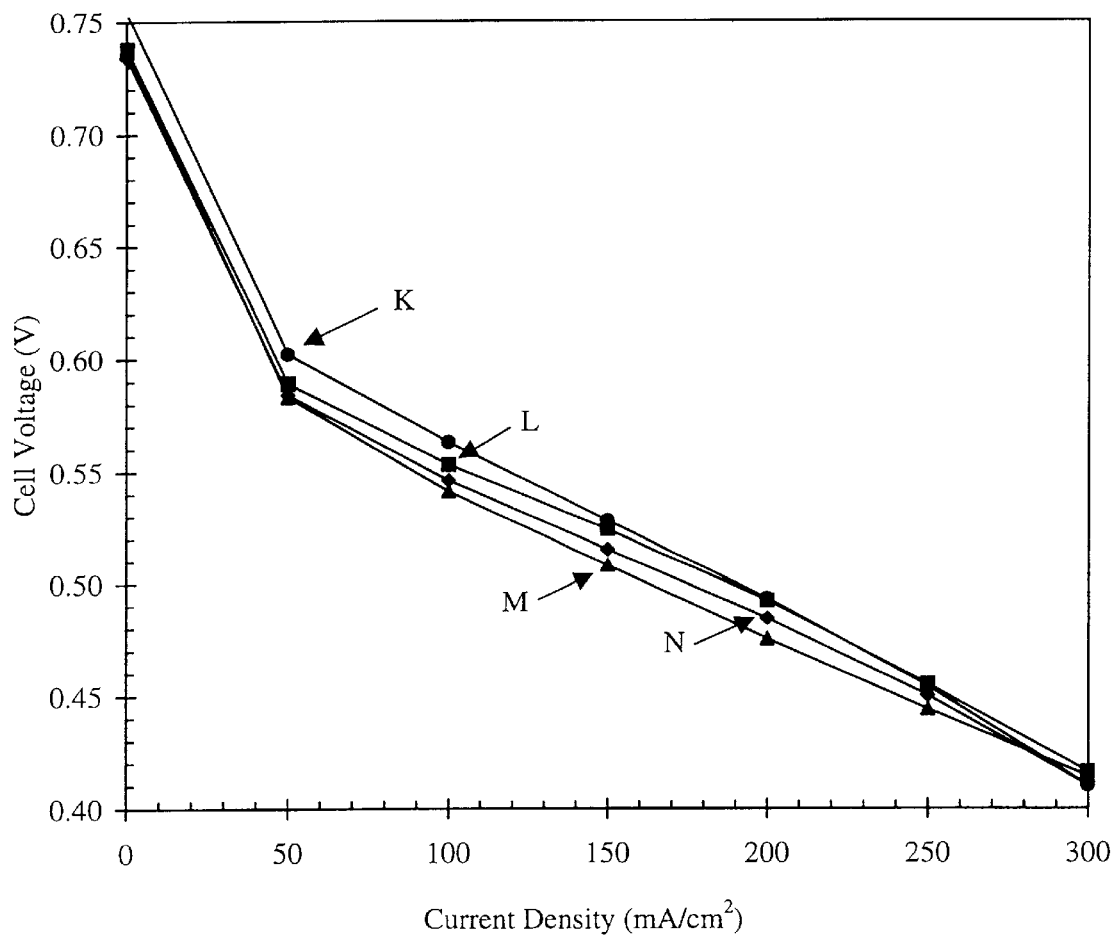
FIG. 5 is a plot showing voltage versus current density plots for the fuel cells of Example 3 with anode substrates into which various loadings of ionomer were incorporated by impregnation prior to a sprayed application of electrocatalyst, and subsequent application of ionomer.

Small scale fuel cells were again made using these anodes and were tested as in Example 1 except that they were operated with a fuel flow rate of about 85 mLpm and an air flow rate of about 4.5 sLpm. The fuel and air stoichiometries were about 19 and 12.5 at 200 mA/cm$^2$ respectively. Plots of cell voltage versus current density for cells using each of the four anodes are shown in FIG. 5. Again, the cells having anodes (K, L) that were impregnated with ionomer before application of the electrocatalyst exhibit better performance than those that weren't (M, N). The cell with anode K showed better performance at low current density than the cell with anode L perhaps as a result of greater total ionomer loading.

EXAMPLE 4

Figure 6:
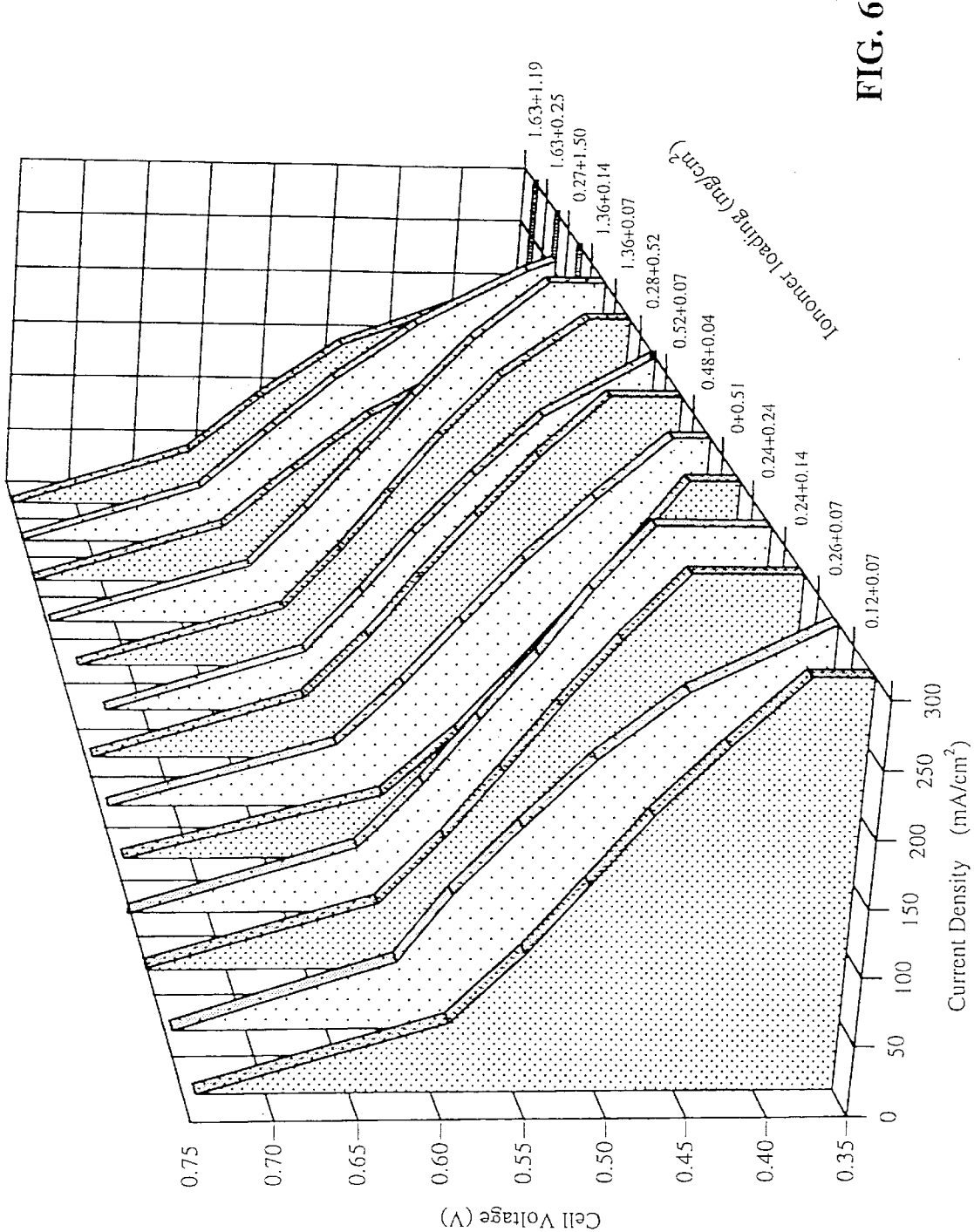
FIG. 6 shows voltage versus current density plots for the fuel cells of Example 4 with anode substrates with varying loadings of ionomer incorporated before and after electrocatalyst application.

A series of thirteen 5.7 cm$^2$ fuel cell anodes was prepared to investigate the effect of ionomer loading incorporated before and after electrocatalyst application on cell performance. The anodes were prepared as in Example 1 except for the varied loadings of ionomer. Ionomer loadings totaling about 0.4–0.6 mg/cm$^2$ could be obtained using a 1% ionomer solution for impregnation and about a 0.5–1% ionomer solution for the subsequent application. Small scale fuel cells were made using each of these anodes and the fuel cells were tested as in Example 3. FIG. 6 shows cell voltage versus current density plots for each of these cells. The ionomer loading in mg/cm$^2$ for each cell is expressed as a sum on an ionomer loading axis. The first number in the sum represents the ionomer loading obtained via impregnation before application of electrocatalyst, while the second number represents the additional ionomer loading applied subsequent to electrocatalyst application. In FIG. 6, the plots have been ordered so as to correspond to increasing total ionomer loading in the cell anodes. Thus, the closest plot is for the cell anode comprising the least ionomer, while the farthest plot is for the cell comprising the most ionomer.

As seen in FIG. 6, there is no smooth trend in performance with total ionomer loading. However, the best performance is achieved with a total ionomer loading of about 0.4–0.6 mg/cm$^2$. Further, the best performance seems to be achieved when the loading applied via impregnation is roughly equal to the loading applied subsequent to the electrocatalyst application.

EXAMPLE 5

Figure 7:
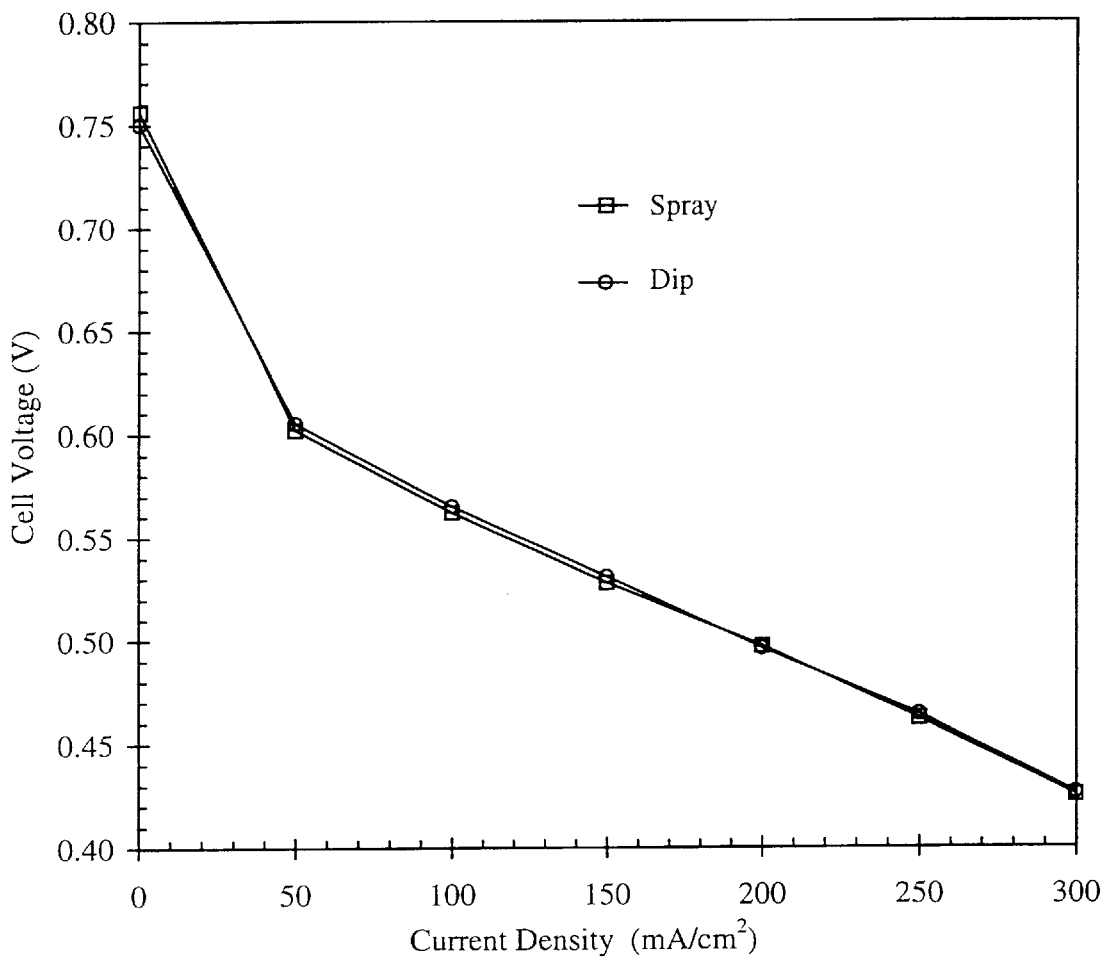
FIG. 7 compares voltage versus current density plots for the fuel cells of Example 5 incorporating anode substrates into which ionomer was impregnated using either a spray technique or a dipping technique.

Finally, an additional anode was prepared as in Example 4 except that ionomer impregnation of the substrate was accomplished using a spray technique rather than by dipping in ionomer solution. This anode had ionomer loadings of 0.24 and 0.23 mg/cm$^2$ applied before and after electrocatalyst application respectively. A fuel cell was constructed and tested as in Example 4. In FIG. 7, the results from this cell are compared to the results obtained from the Example 4 cell which had similar loadings of 0.24 and 0.24 mg/cm$^2$ applied before and after electrocatalyst application respectively but by dipping. There seems to be no significant difference in performance, implying that impregnation can be successfully achieved by a spray method as well as by a dipping method.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings.

What is claimed is:

1. A method of increasing the utilization of the electrocatalyst in a liquid feed, solid polymer electrolyte fuel cell having an electrode supplied with a liquid reactant stream, said electrode comprising a substrate and an electrocatalyst, said method comprising:

impregnating said substrate with a first proton conducting ionomer; and applying said electrocatalyst to said impregnated substrate, thereby inducing a higher rate of electrochemical conversion in said liquid feed, solid polymer electrolyte fuel cell.

2. The method of claim 1 wherein said electrode is an anode and said reactant stream is a liquid fuel.

3. The method of claim 2 wherein said liquid fuel is methanol.

4. The method of claim 3 wherein said electrocatalyst comprises platinum and ruthenium.

5. The method of claim 1 wherein said substrate is carbonaceous.

6. The method of claim 5 wherein said carbonaceous substrate comprises carbon fiber paper.

7. The method of claim 1 wherein said first proton conducting ionomer is a poly(perfluorosulphonic acid).

8. The method of claim 7 wherein said substrate is impregnated with about 0.1 mg/cm$^2$ to about 0.3 mg/cm$^2$ of said poly(perfluorosulphonic acid).

9. The method of claim 1 further comprising applying a second proton conducting ionomer to said impregnated substrate after applying said electrocatalyst.

10. The method of claim 9 wherein the sum of the loading of said first proton conducting ionomer in said impregnated substrate and the loading of said second proton conducting ionomer applied to said impregnated substrate is in the range from about 0.4 to about 0.6 mg/cm$^2$.

11. The method of claim 10 wherein the loading of said first proton conducting ionomer in said impregnated substrate is about equal to the loading of said second proton conducting ionomer applied to said impregnated substrate.

12. The method of claim 9 wherein said second proton conducting ionomer is substantially the same as said first proton conducting polymer.

13. The method of claim 1 wherein said impregnating comprises dipping said substrate in a solution comprising said first proton conducting ionomer.

14. The method of claim 13 wherein said solution comprises about 1% by weight of said first proton conducting ionomer in a solvent comprising an alcohol.

15. The method of claim 1 wherein said impregnating comprises spraying said substrate with a solution comprising said first proton conducting ionomer.

16. The method of claim 1 wherein said electrocatalyst is applied to said impregnated substrate in an aqueous ink.

17. The method of claim 16 wherein said aqueous ink comprises a third proton conducting ionomer.

18. The method of claim 17 wherein said third proton conducting ionomer is substantially the same as said first proton conducting polymer.

19. The method of claim 17 wherein the loading of said third proton conducting ionomer in said impregnated substrate is less than about 0.5 mg/cm$^2$.

20. The method of claim 1 wherein said applying comprises one of screen printing, spray coating, roll coating and spreading.

21. The method of claim 1 wherein said electrocatalyst is applied in the form of an aqueous ink.

22. A liquid feed, solid polymer electrolyte fuel cell comprising an electrode supplied with a liquid reactant stream, said electrode comprising a substrate and an electrocatalyst, wherein said substrate is impregnated with a first proton conducting ionomer and said electrocatalyst is applied to said impregnated substrate.

23. The liquid feed, solid polymer electrolyte fuel cell of claim 22 wherein said electrode is an anode and said reactant stream is a liquid fuel.

* * * * *